(12) United States Patent
Weidenheimer et al.

(10) Patent No.: US 7,456,521 B2
(45) Date of Patent: Nov. 25, 2008

(54) ELECTRONICALLY RECONFIGURABLE BATTERY

(75) Inventors: Douglas M. Weidenheimer, Brentwood, CA (US); Kevin J. Donegan, Wilton, NY (US); David Wayne Morton, San Leandro, CA (US)

(73) Assignee: L-3 Communications Titan Corporation, San Diego, CA (US)

( * ) Notice: Subject to any disclaimer, the term of this patent is extended or adjusted under 35 U.S.C. 154(b) by 0 days.

(21) Appl. No.: 11/482,914

(22) Filed: Jul. 10, 2006

(65) Prior Publication Data

US 2006/0249318 A1 Nov. 9, 2006

Related U.S. Application Data

(63) Continuation of application No. 10/631,017, filed on Jul. 31, 2003, now Pat. No. 7,075,194.

(51) Int. Cl.
*H02J 1/00* (2006.01)

(52) U.S. Cl. .......................................... 307/71
(58) Field of Classification Search .................... 307/71
See application file for complete search history.

(56) References Cited

U.S. PATENT DOCUMENTS

| | | | | |
|---|---|---|---|---|
| 4,509,102 A | * | 4/1985 | Ayer | ........................... 361/92 |
| 5,883,484 A | * | 3/1999 | Akao | ........................... 318/700 |
| 6,624,535 B2 | * | 9/2003 | Morrow | ......................... 307/71 |
| 6,718,927 B2 | * | 4/2004 | Goetze et al. | ............. 123/179.3 |
| 6,731,022 B2 | * | 5/2004 | Silverman | ..................... 307/43 |

* cited by examiner

*Primary Examiner*—Robert L. Deberadinis
(74) *Attorney, Agent, or Firm*—Rothwell, Figg, Ernst & Manbeck, P.C.

(57) ABSTRACT

An electronically reconfigurable battery includes a number of battery modules selectively interconnected by a number of electronic switches, wherein a selectable number of battery modules may be connected either in a series configuration or in a parallel configuration, as a result of placing selected switches of said plurality of switches in open states or closed states. In a parallel configuration, the battery provides power to a primary load, such as a propulsion load for a vehicle. In a series configuration, the battery is configured to provide a high voltage and high power output to a short-term and/or pulsed load, such as an additional load provided on the vehicle. Current from the battery is limited in one of three ways: a) by the batteries themselves; b) a current limiting device or system in series with the total erected battery; or c) a single level power converter or current limiter that is used to erect and charge the capacitor bank in a sequential one level at a time manner until the battery is fully erected and the capacitor is fully charged.

21 Claims, 6 Drawing Sheets

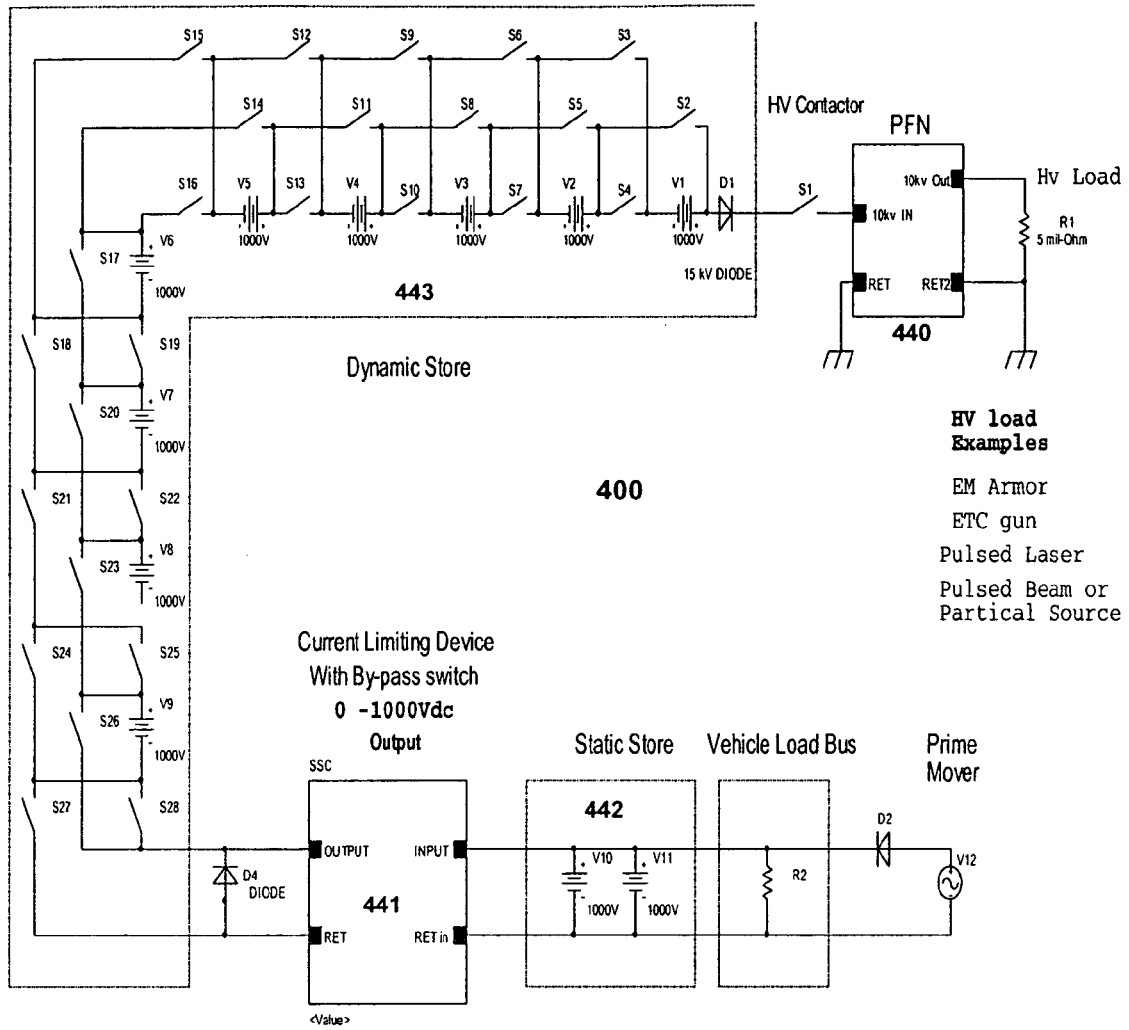
FIG. 4 ERB with Current limiting Device inserted between the Dynamic Battery Store and Static Battery Store. Following Examples is a 10000 Volt ERB with 1000 Volt battery stages configuration

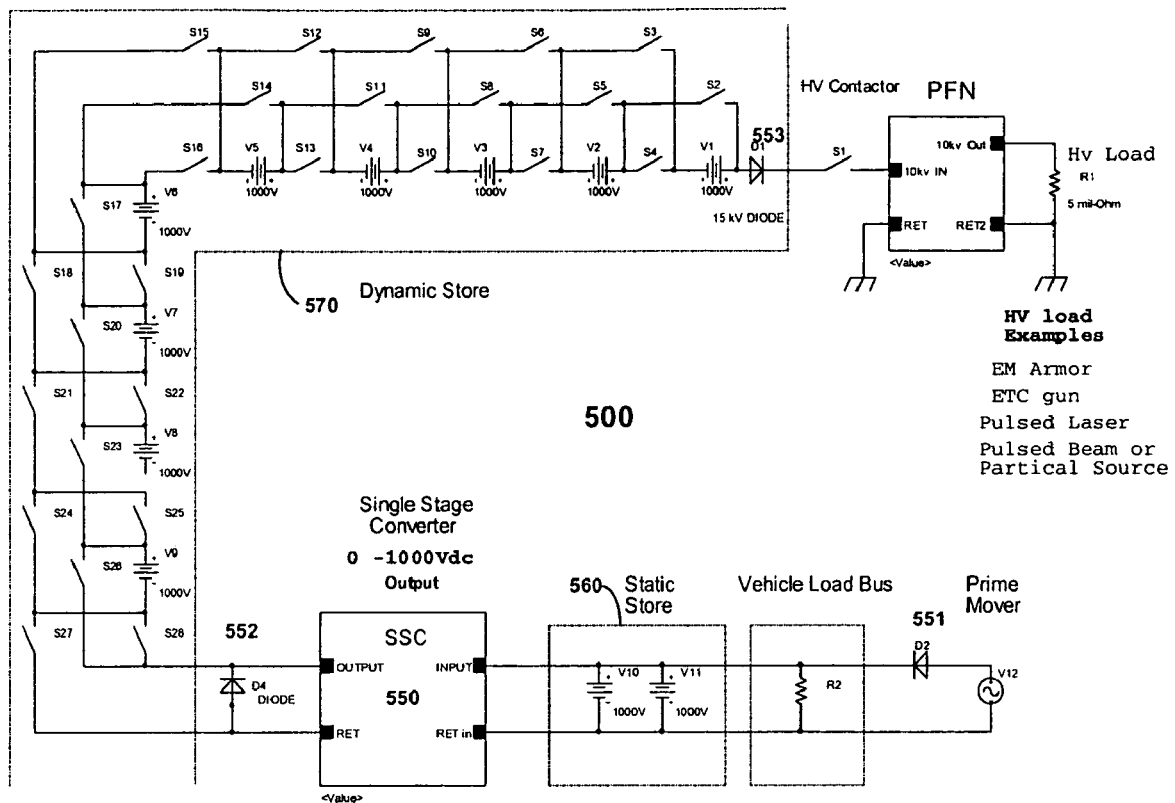
FIG. 5 ERB with Single Stage Converter Block inserted between the Dynamic Store and Static Store portions of the battery

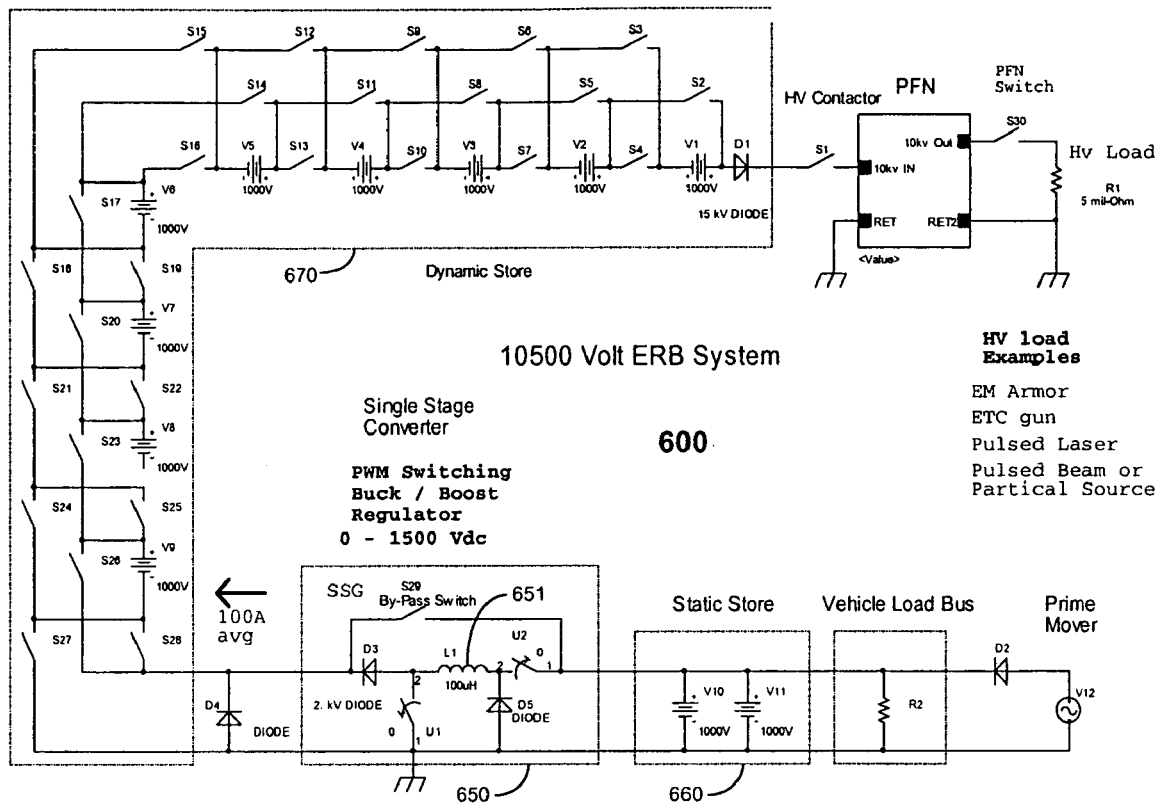
FIG. 6 10.5 kV ERB with a single stage Buck\Boost converter.

ELECTRONICALLY RECONFIGURABLE BATTERY

CROSS-REFERENCES TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to electrical energy storage systems and in particular to battery packs composed of multiple battery modules with adjustable configurations. The reconfigurable electrical energy storage system is especially useful in hybrid electric vehicles, ships, or boats (i.e., vehicles, ships, or boats powered by both a prime mover and an electrical energy power source) used in military operations and in other fixed or moving platforms where it is desirable to be able to redirect and level shift the stored energy in the reconfigurable electrical energy storage system. Examples of such reconfigurations include a shift from a low voltage parallel configuration to high voltage series/parallel configurations for optimizing impedance match, minimizing or eliminating the need for an associated power converter for pulsed power applications, powering other subsystems or matching variable DC link main systems as envisioned in the original CHPS combat hybrid vehicle. That envisioned system shifted from a 300-400V low voltage parade voltage to a higher 900-1200V Combat status bus voltage.

The reconfigurable electrical energy storage system may combine one or all one or all of the above-mentioned features.

2. Description of the Related Art

Hybrid electric vehicles (HEVs), hybrid electric ships and boats (such as the QE2) afford greater fuel efficiency than vehicles or vessels having only a prime mover (e.g., diesel or gasoline engine, gas turbine and fuel cell). This greater efficiency is obtained by using an energy store to level the load on the prime mover—providing peaking power to an electric motor, or storing energy during low power prime mover operation or during regenerative braking.

A well-developed form of energy storage for this application is a battery pack and there are several candidate battery chemistry systems that may be utilized. Of these, the lithium-ion (Li-ion) technology is the most energy and power dense. Li-ion cell technology for this application is currently capable of energy density of up to 134 W-hr (482 kJ) per kg (HE40 cell), and a power density of up to 13 kW per kg (HP18650 cell short duration, manufactured by SAFT America).

Vehicle battery packs sized for multiple military combat missions, (such as the Combat Hybrid Power Systems (CHPS) Systems. Integration Lab (SIL) battery pack) store approximately 108 MJ (30 kW-hr). If the highest power density SAFT cells (HP18650) are utilized, then the short duration power capability of the battery pack would be greater than 4 MW.

Such a peak power capability could enhance both offensive and defensive capabilities if it were easily convertible to voltages commensurate with a range of potential short-term and pulsed loads. For example, Electromagnetic Armor (EMA) provides lightweight protection to combat vehicles against rocket-propelled grenade attacks. The energy required for the EMA to function is stored in a fast discharge capacitor bank, which is recharged either from a generator operated by the prime mover of the vehicle, or from an intermediate energy storage system. In a HEV, the electric energy battery pack also could function as such an intermediate energy storage system. However, in order to provide the approximately 10 kV needed as the input voltage to the capacitor bank, a DC-DC power converter is needed between the intermediate energy storage system and the capacitor bank.

The traditional methods for DC-DC power conversion typically involve the use of inverters and heavy-duty transformers. Current EMA designs require approximately 150 kJ to recharge the capacitor bank. At 3 pps (pulses per second) operation, even for a short period of time, the recharge time would have to be on the order of 300 ms. Consequently, the recharge power would have to be on the order of 500 kW average, or 1 MW peak. However, a 1 MW peak power traditional DC-DC converter, using present technology, would add more volume and mass to the vehicle platform than is allowable in a 16-20 ton class vehicle.

Thus, there exists a need in the art for a system power density improvement in producing short term high power at high voltages from a battery pack normally configured to provide hybrid vehicle prime mover load leveling and/or silent mobility capability or in other fixed or moving battery platforms such as battery backpack systems or pulsed energy weapons or launch systems.

BRIEF SUMMARY OF THE INVENTION

The present invention provides an alternative method for converting DC from bus voltage to a voltage that is compatible with various loads. According to the present invention, the battery pack is electronically re-configured to produce multiples of the bus voltage, momentarily and on command. Such a battery pack would be configured in modules that are equal to the power distribution bus voltage. The entire battery pack, or some fraction thereof, then can be erected and de-erected on command, analogous to the operation of a Marx generator (commonly used for capacitive voltage multiplication).

According to the invention, the need for intermediate DC-DC power conversion circuitry is reduced or eliminated by using electronic switching to convert the battery pack modules from their normal parallel configuration for vehicle or ship load leveling and/or silent mobility functions, to a series configuration that is capable of delivering the necessary high power and high voltage output for short-term and pulsed load operations.

In particular, according to first preferred embodiment, the present invention provides an electronically reconfigurable battery, including a first number of battery modules, a number of switches selectively interconnecting the battery modules, wherein a selectable number of the battery modules may be connected either in a series configuration or in a parallel configuration, as a result of placing selected switches of the switches in open states or closed states, and an output switch connecting a first output terminal of the battery to a first load. DC current flow is limited and controlled by electrochemical DC current discharge characteristics of the battery technology used, such as in the case of lithium-ion (Li-ion) technology.

In a second embodiment, the invention provides an electronically reconfigurable battery, including a first number of battery modules, a number of switches selectively interconnecting the battery modules, and a current limiting section or a current limiting DC-DC converter, wherein a selectable number of the battery modules may be connected either in a series configuration or in a parallel configuration, as a result of placing selected ones of the switches in open states or in closed states, and an output switch connecting a first output terminal of the battery to a first load.

The DC current limiting device is used to control the current outside the range of the electrochemical DC current discharge characteristics of the battery technology used. A parallel operation DC by-pass switch is optionally incorporated within the current limiting section dependent on the technology used and where the section is located at the beginning or end of the series connected batteries. A simple example of this current limiting section is a series connected power resistor, or inductor connected in series between the high voltage battery end terminal and a Pulse Forming Network capacitor bank (commonly known as a PFN capacitor) forming the resistive, the inductive or resonant capacitor charging circuit.

According to a third embodiment, the present invention provides an electronically reconfigurable battery, including a first number of battery modules, a number of switches selectively interconnecting the battery modules, a single stage current limiting section or a single stage current limiting DC-DC converter (hereinafter referred to as a single stage converter or SSC). The SSC may take the form of a resistor or inductor or a reduced size electronic DC-DC converter using some form of Buck, Boost, Buck/Boost or Resonate or inductive converter topology, wherein a selectable number of the battery modules may be connected either in a sequential series configuration operation or in a parallel configuration, as a result of placing selected switches of the switches in open states or closed states, and an output switch connecting a first output terminal of the battery to a first load. A DC current limiting device is used to control the current outside the range of the electrochemical DC current discharge characteristics of the battery technology used. A parallel operation DC by-pass switch is optionally incorporated within the current limiting section dependent on the technology used and whether the section is located at the beginning, end or middle of the series connected batteries.

BRIEF SUMMARY OF THE DRAWINGS

FIG. 4 is a schematic diagram of an electronically reconfigurable battery including a current limiting section according to second preferred embodiment of the present invention, for use with an electromagnetic armor (EMA) system for a combat hybrid electric vehicle and other platforms;

FIG. 5 is a schematic diagram of an electronically reconfigurable battery including a single stage converter (SSC) according to a third preferred embodiment of the present invention, for use with an electromagnetic armor (EMA), ETC Gun, pulsed laser, pulsed beam, energy or particle source systems for a combat hybrid electric vehicle and other platforms; and FIG. 6 is a schematic diagram of an electronically reconfigurable battery including a single stage buck/boost converter section (SSC) according to an alternate configuration of the third preferred embodiment of the present invention, for use with an electromagnetic armor (EMA), ETC Gun, pulsed laser, pulsed beam, energy or particle source systems for a combat hybrid electric vehicle and other platforms.

DETAILED DESCRIPTION OF THE INVENTION

Figure 1:
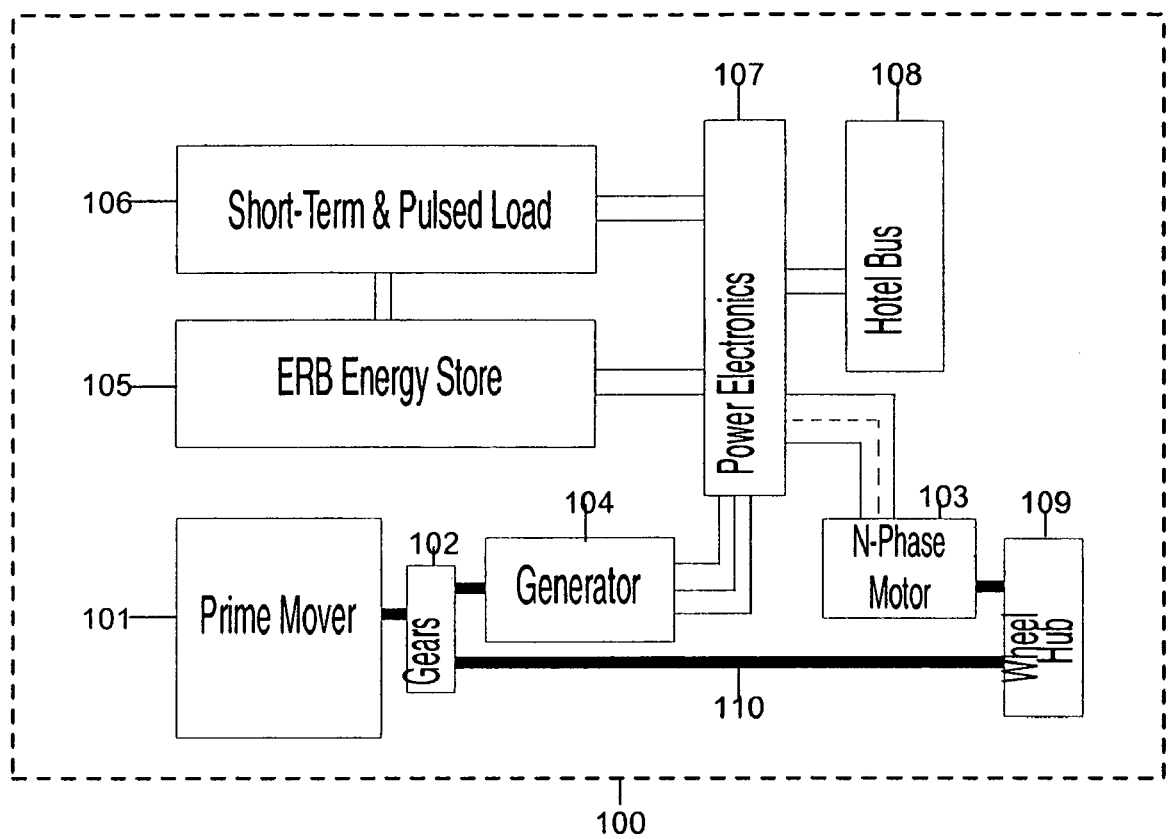
FIG. 1 is a block diagram of a hybrid electric vehicle platform power distribution system including an electronically reconfigurable battery according to the present invention.

As shown in FIG. 1, a hybrid vehicle platform power distribution system includes a prime mover (e.g., diesel engine, gas turbine, fuel cell, etc.) coupled to the vehicle transmission (gears), and an n-phase electric motor coupled directly to the drive wheels of the vehicle. The gears also are coupled to a generator for recharging the electrical energy storage (ERB energy store), for example, during regenerative vehicle braking and during low power prime mover operation. The ERB energy store functions to power the n-phase motor for vehicle load leveling and/or silent mobility operation, and also is used to provide power to various short-term and pulsed load devices. Power electronic circuitry controls the reconfiguration of the ERB, the interfacing between the generator, motor, ERB store, and short-term and pulsed loads, as well as providing appropriate bus voltage to a voltage bus (hotel bus).

Figure 2:
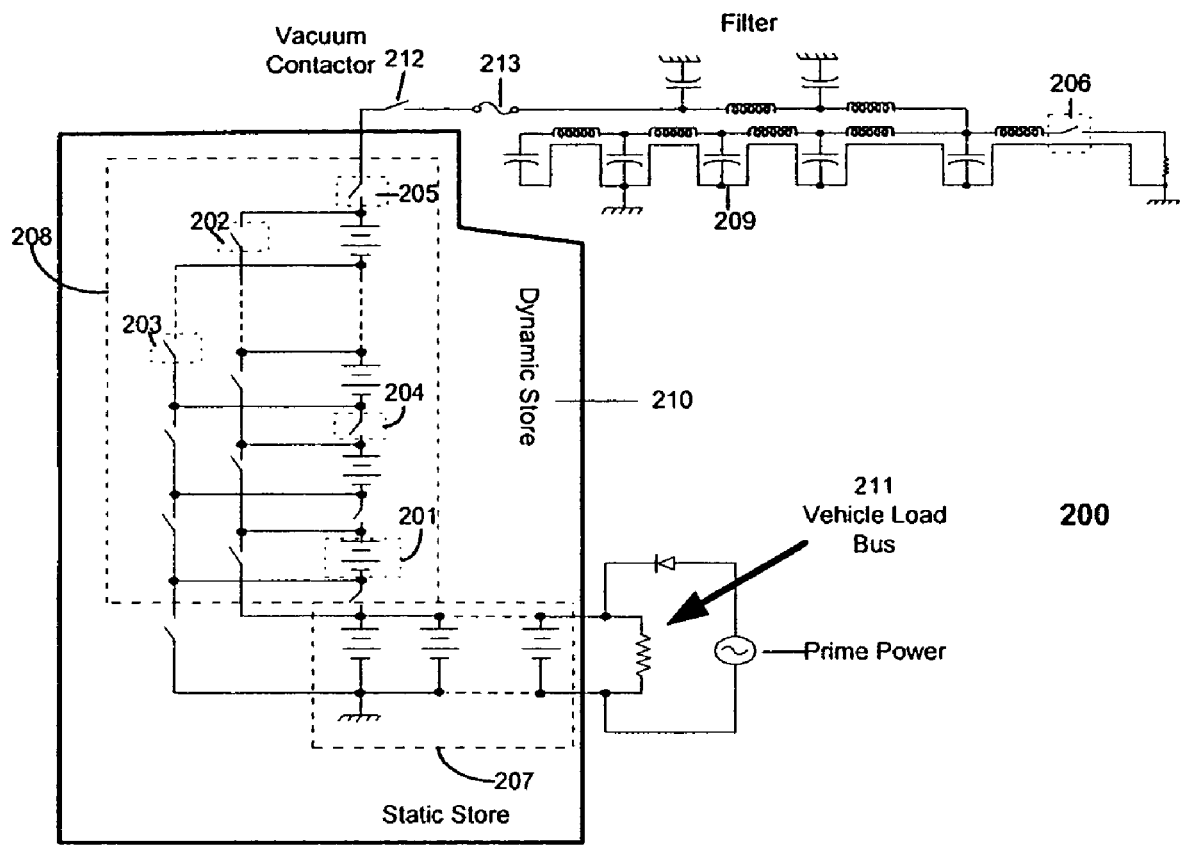
FIG. 2 is a schematic diagram of an electronically reconfigurable battery according to a first preferred embodiment of the present invention, for use with an electromagnetic armor (EMA) system for a combat hybrid electric vehicle and other platforms.

As shown in FIG. 2, an electronically reconfigurable battery 10 according to the first embodiment of the invention includes a number of battery modules 1. An example of such a battery module is an Ultralife® lithium polymer rechargeable battery module (e.g., UBC44 or UBC38). Other candidate modules include SAFT HP cells (such as HP 12, HP 6, HP 18650).

The battery 10 includes a number of modules that are permanently configured in parallel with each other (static store) and connected to the vehicle load bus, which powers the electric motor. Other modules (dynamic store) can be switched between parallel configuration to support the vehicle load bus, and a series configuration to charge the EMA capacitor bank 20 (or other short-term or pulsed load not shown). The electronic reconfiguration of the dynamic store modules requires three switches per module.

An erectable battery module 1 is associated with battery isolation switches 2 and 3, and a series switch 4. All switches (with the exception of the output switch) need only block the voltage of a single battery module and open at near zero current (for capacitor charging) in normal operation. Transient conditions during erection and de-erection are controlled by passive snubbing. Reconfiguration can be accomplished in less than 1 ms using standard off-the-shelf solid state switches such as IGBTs or MOSFETs.

Switches 2-4 are rated only for the module voltage (such as 1 kV). Switch 5 is an output switch that is rated for the full output of the ERB (e.g., 10 kV and 100 amps), and can be implemented as a series stack of the same switches used for switches 2-4. A vacuum contactor 30 and fuse 40 are placed in series with the output switch 5 to provide fault protection and charge interrupt. All switches are opto-isolated, with gate power drawn from their associated adjacent battery modules. Switch 6 is high-voltage high-current closing switch, and can be either a vacuum switch or a solid state switch. Switch 6 discharges the EMA capacitor bank into the EMA load.

With some 8,000 cells necessary to make up a 30 kW-hr vehicle battery pack, voltages would be available in multiples of the distribution bus voltage up to 30 kV. Furthermore, each of these voltage levels is available with the full power capability of the battery pack. Construction techniques used in the HP18650 are scaleable to larger or smaller individual cells so that optimization for the particular application is possible.

EXAMPLE

Assuming a 20-ton class vehicle and extrapolating from CHPS requirements, a conceptual design of an ERB for a hybrid electric vehicle with an EMA system has the following requirements: 1) Deliver up to 400 kW to the vehicle bus at 1 kV in parallel operation; 2) Recharge a 150-kJ capacitive store to 10 kV in 300 milliseconds; 3) Support 30-45 minute silent operation at 80 kW. These requirements mandate the use of very high energy and power density batteries. Two candidate batteries are the HP series of lithium ion batteries being developed by SAFT and the lithium polymer batteries produced by Ultralife Batteries, Inc. for use in cell phones. The SAFT batteries have a slight advantage in usable power density and packaging for military use, whereas the Ultralife batteries have an advantage in cost (0.15-0.2 cents/J, 5-8 cents/Wpk, owing to volume production) and a potential for more compact packaging (prismatic) in ERB service.

The ERB system in this case constitutes only ⅓rd of the total battery for erected (dynamic) operation. The remaining ⅔rd of the store (static) is dedicated to load leveling and silent mobility. The total capacity of ~290 MJ (80 kW-hr) accommodates silent mobility requirements. With only ⅓rd (90 MJ, 25 kW-hr) of the total capacity configured for on-command electronic erection and de-erection, the vehicle energy storage system maintains its load leveling and silent operation capability even when the EMA is active.

54 series×7 parallel Ultralife Model UBC44106102 polymer batteries are assembled into 200-volt stacks (378 cells per pack), in the static store. Five of these packs are placed in series to obtain an output voltage equal to that of the vehicle bus and constitute a module. Two such modules in parallel make up the static store (3780 cells total). In the dynamic portion of the store, the UBC383562 cell is used because of its heavier tabbing and proven current capability. The 200-volt packs in this case consist of 54 series×4 parallel cells (216 total). Five such packs make up an erectable module and there are 10 modules, thus providing 10 kV on command for EMA store charging (approximately 90 MJ; 10,800 total cells). A dynamic module will incorporate all necessary switches, isolation and thermal management hardware The total battery volume in the static store is approximately 0.18 m3 and the accessories are expected to add another 0.135 m3 for a total volume of approximately 0.315 m3 and a mass of 620 kg. The dynamic store is less efficient volumetrically, because for the need to insulate for the 10 kV momentary operation and thermal stress associated with MW-class power for even a few seconds. We expect a battery volume of 0.089 m3 with a total of volume of 0.314 m3 and a mass of 500 kg, when accessories are included, for the dynamic store. These total to a volume of 0.629 m3 and mass of 1120 kg for the entire vehicle battery pack (~300 MJ).

Figure 3:
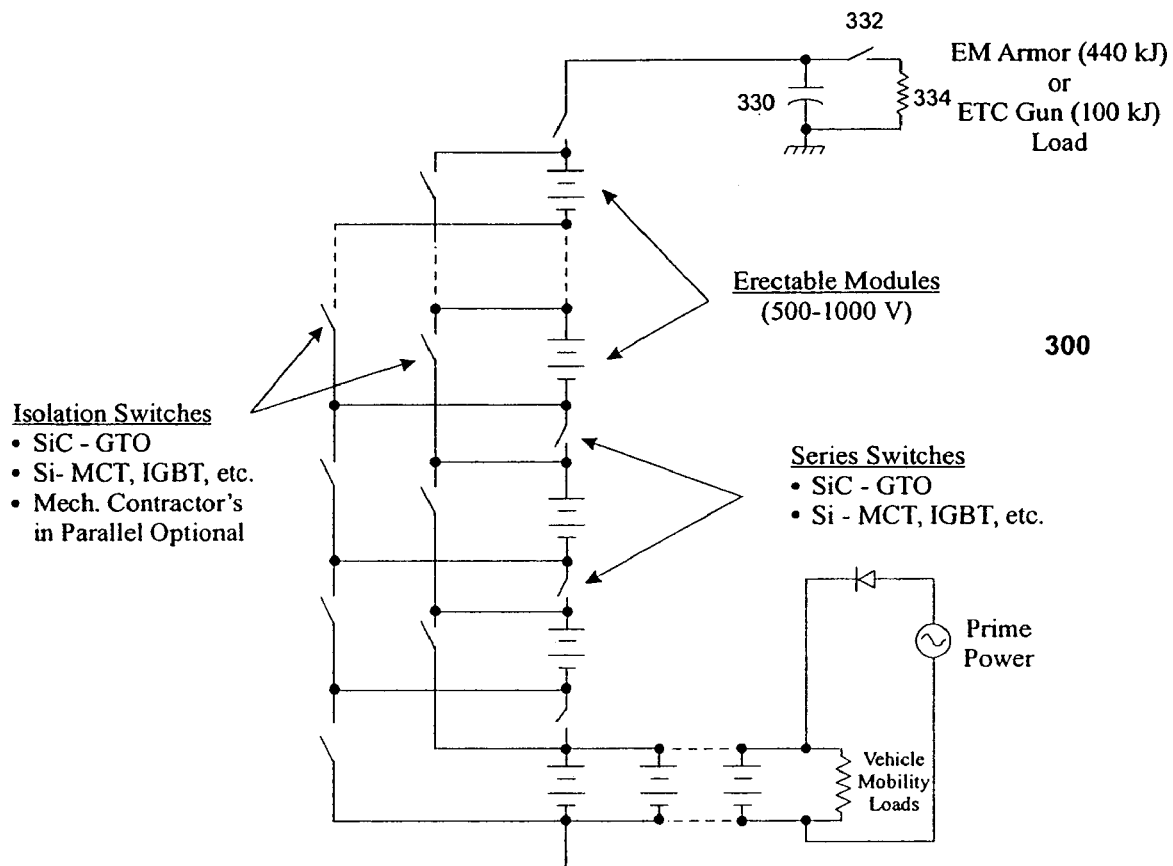
FIG. 3 is a schematic diagram of an electronically reconfigurable battery according to first preferred embodiment of the present invention, for a generic application.

FIG. 3 shows a generic application of the ERB system according to the invention, wherein the ERB charges an energy store represented by a capacitor 30, which is discharged via a switch 32 into a load represented by a resistor 34.

FIG. 4 shows the second embodiment, which has the same configuration as FIG. 2, with the PFN represented by a block, and further including a current limiting device inserted between the static and dynamic portions of the battery.

FIG. 5 shows the third embodiment, which has the same configuration as FIG. 4 except with a SSC replacing the current limiting device. The charge sequence is different from the first and second embodiments, in that a sequential step charge mode of operation can be used with the circuit of FIG. 5, also the list of applicable loads is expanded and can be applied to all embodiments.

FIG. 6 is an alternate example of the third embodiment showing the ERB configured for a sequential step charge mode using a Buck/boost PWM single stage converter (SSC) type. The high-speed semiconductor switches U1, U2 can be bipolar transistors, MOSFETs, IGBTS, SCR and other power semiconductor switches. Other converter types such as buck, boost and other electronic converter topologies are similar in operation and also can be used for the switching regulator.

Example of Sequential Step Charge Operation Used in the Third Embodiment

The sequential step charging operation mode using a single stage converter (SSC) as shown in FIGS. 5 and 6 is described below.

The best location for the single stage converter is between the static and dynamic portion of the battery as this limits the voltage stresses seen by the internal components, but the SSC can be located anywhere within the series-connected loop that starts with the static store portion of the battery and ends with the PFN capacitor bank. A single inductor, non-isolated buck/boost or interleaved buck/boost configuration is the preferred topology. A by-pass switch will normally be employed in this location to connect the dynamic portion of the battery to the static portion in a low loss manner, bypassing the SSC in the parallel mode of operation.

In the series sequential charge operation, the PFN capacitor bank is charged in ten (10) sequential steps.

First, the switches of the dynamic store portion of the battery are all opened except for the positive isolation set of switches; the SSC is now directly connected between the static portion of the battery and the PFN capacitor.

Next the SSC (the buck/boost converter of FIG. 6 will be used for this explanation) is turned on and charges the PFN capacitor bank at a controlled current (100A) to approximately slightly more (1010-1200V) than the single battery module voltage (1000V) at which point it shuts down momentarily and a battery module is erected in series with the SSC by selectively opening and closing the appropriate switches. The SSC is turned back on and PFN capacitor bank charges at the controlled current until the SSC reaches its controlled output voltage set point at which time it will shut off again.

The stored voltage in the PFN capacitor bank is now V (SSC)+battery V1 (2010-2200V).

The cycle is repeated until all the batteries with the SSC are erected in series, or the desired stored PFN voltage set point is reached (V PFN=(V (SSC)+batteries V1+V2+V3+V4+V5+V6+V7+V8+V9=(900-10200V)). By using this method the power processing capability required of the SSC is reduced from the system level power delivered (10 kV @100A) by the number of battery stages erected plus one (in this case 10) for a (SSC) nominal power rating of 1000v @100A or 100 kW. This reduces the converter size by a factor of more than ten because the converter has 1/10 of the voltage stresses and no longer needs an isolation or step-up transformer. PFN voltage regulation is finer and smoother than the first embodiment; however the first embodiment is the smallest physically, the most robust and is the cheapest to build.

Normal Operation

As shown in FIGS. 5 and 6, the dynamic part of the battery store is connected as nine parallel 1000 volt batteries (V1-V9) connected in parallel with the main or static portion (V10-V11) of the battery system. In normal operation, negative isolation switches S3, S6, S9, S12, S15, S18, S21, S24, S27 and positive isolation switches S2, S5, S8, S11, S14, S17, S20, S23 and S26 are closed, and bypass switch S29 in the SSC is closed. Battery series switches S4, S7, S10, S13, S16, S19, S22, S25 and S28 as well as HV contactor S1 are open. The battery now has 11 parallel sections to power a vehicle.

ERB Dynamic Operation

The ERB dynamic section is erected in 10 steps, which are now explained with reference to FIG. 6.

Step One—Converting from Static to Dynamic Mode and Single Stage Converter (SSC) Charging of the Pulse Forming Network (PFN) from 0 to 1200 Volts The shift from static to dynamic operation begins with the SSC bypass switch and all negative isolation and series connected switches being opened. All positive isolation switches are kept closed and HV contactor S1 switches from being opened to closed.

The SSC then switches to a charge mode and begins charging the PFN storage capacitor bank at an average current of 100 Amperes. The current flow path is through positive switches S2, S5, S8, S11, S14, S17, S20, S23 and S26, which then forward bias diode D1, allowing the current to flow through HV contactor S1 into the PFN capacitor bank. At a PFN charge voltage of 1200 volts, the SSC stops charging and goes into an idle mode for the Step 2 ERB configuration change. Current flowing into PFN stops and goes to zero.

SSC Charge and Idle Modes of Operation

In the charge mode of operation, for SSC Voltage Output (Vout) range from zero to approximately 1000 volts, the SSC is in a step-down buck regulator mode with solid state high speed semiconductor switch U2 open and solid state high speed semiconductor switch U1 operating in a variable duty cycle Pulse Width Modulation (PWM) scheme to maintain an average output current of 100A (Iout). For the Vout range from 1000-1200 volts, the SSC shifts to a step-up boost mode and U1 is now on at a 100% duty cycle, and U2 is PWM modulated to control the output current.

When Vout reaches 1200 volts, the SSC is put in idle mode and U2 is then turned on at 100% PWM and the SSC voltage output and current drop to zero. The loss of the SSC Vout of 1200 volts results in reverse biasing diode D1 as the voltage difference between the PFN voltage and the dynamic store section is −1200 volts. The current flow through the dynamic store battery section falls to zero due to the reverse biasing of Diode D1. Average current in the SSC's inductor is maintained by PWM modulating U1 while U2 is 100% on. At this point the process proceeds to step two.

Step Two—Erecting First Battery Stage—PFN Charging Voltage of 1200-2200 Volts

SSC starts the step 2 cycle in IDLE mode, Vout and Iout are at zero, negative switches S3, S6, S9, S12, S15, S18, S21, S24, and S27 are open. Switch S2 now opens and switch S4 now closes, connecting battery V1 in series with the SSC output. The SSC now switches back to CHARGE mode and charges the PFN from 1200 volts to 2200 volts by the series voltage addition of SSC Vout and V1 (1000V). Again Vout only varies over a range from 0-1200Volts. At PFN charge voltage of 2200 volts, the SSC goes back into IDLE mode for the Step 3 ERB configuration change.

The amount of time needed for the SSC to be in the IDLE mode is determined by the time required for the diode D1 current to fall to zero and the time required to set the ERB switches to the new configuration. Total IDLE time per step change is estimated to be in the 10-100 microsecond range.

Step 3—Erecting Second Battery Stage—PFN Voltage 2200-3200 Volts

SSC starts step 3 cycle in IDLE mode, Vout and Iout are at zero, negative switches S3, S6, S9, S12, S15, S18, S21, S24, and S27 are open. Switch S2 is open and switch S4 is closed. Switch S5 is now opened and switch S7 is now closed, connecting batteries V1 and V2 in series with the SSC output. The SSC now switches back to CHARGE mode and charges the PFN from 2200 to 3200 volts by the series voltage addition of SSC Vout and V1, V2 (2 kV). Again, Vout only varies over a range from 0-1200 volts. At PFN charge voltage of 3200 volts, the SSC goes back into IDLE mode for the Step 4 ERB configuration change.

Step 4—Erecting Third Battery Stage—PFN Voltage 3200-4200 Volts

The SSC starts step 4 cycle in the IDLE mode, Vout and Iout are at zero, negative switches S3, S6, S9, S12, S15, S18, S21, S24, S27 are open. Switches S2, S5 are open and switches S4, S7 are closed. Switch S8 is now opened and switch S10 is now closed, connecting batteries V1, V2, and V3 in series with the SSC output.

The SSC now switches back to CHARGE mode and charges the PFN from 3200 to 4200 volts by the series voltage addition of SSC Vout and V1, V2, V3 (3 kV). Vout varies over a range from 0-1200 volts. At PFN Charge voltage of 4.2 kV, the SSC goes back into IDLE mode for the Step 5 ERB configuration change.

Step 5—Erecting Fourth Battery Stage—PFN Voltage 4200-5200 Volts

SSC starts step 5 cycle in IDLE mode, Vout and Iout are at zero, negative switches S3, S6, S9, S12, S15, S18, S21, S24, S27 are open. Switches S2, S5, S8 are open and switches S4, S7, S10 are closed. Switch 14 is now opened and switch 16 is now closed, connecting batteries V1, V2, V3, and V4 in series with the SSC output.

The SSC now switches back to CHARGE mode and charges the PFN from 4200 to 5200 volts by the series voltage addition of SSC Vout and V1, V2, V3, V4 (4 kV). Vout varies over a range from 0-1200 volts. At PFN Charge voltage of 5200 Volts, the SSC goes back into IDLE mode for the Step 6 ERB configuration change.

Step 6—Erecting Fifth Battery Stage—PFN Voltage 5200-6200 Volts

SSC starts step 6 cycle in IDLE mode, Vout and Iout are at zero, negative switches S3, S6, S9, S12, S15, S18, S21, S24, S27 are open. Switches S2, S5, S8, and S11 are open and switches S4, S7, S10, and S13 are closed. Switch 14 is now opened and switch 16 is now closed, connecting batteries V1, V2, V3, V4, and V5 in series with the SSC output.

The SSC now switches back to CHARGE mode and charges the PFN from 5200 to 6200 volts by the series voltage addition of SSC Vout and V1, V2, V3, V4, V5 (5 kV). Vout varies over a range from 0-1200 volts. At PFN Charge voltage of 6200 Volts, the SSC goes back into IDLE mode for the Step 7 ERB configuration change.

Step 7—Erecting Sixth Battery Stage PFN Voltage 6200-7200 Volts

SSC starts step 7 cycle in IDLE mode, Vout and Iout are at zero, negative switches S3, S6, S9, S12, S15, S18, S21, S24, S27 are open. Switches S2, S5, S8, S11 and S14 are open and switches S4, S7, S10, S13 and S16 are closed. Switch 17 is now opened and switch 19 is now closed, connecting batteries V1, V2, V3, V4, VS and V6 in series with the SSC output.

The SSC now switches back to CHARGE mode and charges the PFN from 6200 to 7200 volts by the series voltage addition of SSC Vout and V1, V2, V3, V4, VS, V6 (6 kV). Vout varies over a range from 0-1200 volts. At PFN Charge voltage of 7200 Volts, the SSC goes back into IDLE mode for the Step 8 ERB configuration change.

Step 8—Erecting Seventh Battery Stage PFN Voltage 7200-8200 Volts

SSC starts step 8 cycle in IDLE mode, Vout and Iout are at zero, negative switches S3, S6, S9, S12, S15, S18, S21, S24, S27 are open. Switches S2, S5, S8, S11, S14 and S17 are open and switches S4, S7, S10, S13, S16 and S19 are closed. Switch 20 is now opened and switch 22 is now closed, connecting batteries V1, V2, V3, V4, V5, V6 and V7 in series with the SSC output.

The SSC now switches back to CHARGE mode and charges the PFN from 7200 to 8200 volts by the series voltage addition of SSC Vout and V1, V2, V3, V4, V5, V6, V7 (7 kV).

Vout varies over a range from 0-1200 volts. At PFN Charge voltage of 8200 Volts, the SSC goes back into IDLE mode for the Step 9 ERB configuration change.

Step 9—Erecting Eighth Battery Stage PFN Voltage 8200-9200 Volts

SSC starts step 9 cycle in IDLE mode, Vout and Iout are at zero, negative switches S3, S6, S9, S12, S15, S18, S21, S24, S27 are open. Switches S2, S5, S8, S11, S14, S17 and S20 are open and switches S4, S7, S10, S13, S16, S19 and S22 are closed. Switch 23 is now opened and switch 24 is now closed, connecting batteries V1, V2, V3, V4, V5, V6, V7 and V8 in series with the SSC output.

The SSC now switches back to CHARGE mode and charges the PFN from 8200 to 9200 volts by the series voltage addition of SSC Vout and V1, V2, V3, V4, V5, V6, V7, V8 (8 kV).

Vout varies over a range from 0-1200 volts. At PFN Charge voltage of 9200 Volts, the SSC goes back into IDLE mode for the Step 10 ERB configuration change.

Step 10—Erecting Ninth Battery Stage PFN Voltage 9200-10200 Volts

SSC starts step 10 cycle in IDLE mode, Vout and Iout are at zero, negative switches S3, S6, S9, S12, S15, S18, S21, S24, S27 are open. Switches S2, S5, S8, S11, S14, S17, S20 and S23 are open and switches S4, S7, S10, S13, S16, S19, S22 and S25 are closed. Switch 26 is now opened and switch 28 is now closed, connecting batteries V1, V2, V3, V4, V5, V6, V7, V8 and V9 in series with the SSC output.

The SSC now switches back to CHARGE mode and charges the PFN from 9200 to 10200 volts by the series voltage addition of SSC Vout and V1, V2, V3, V4, V5, V6, V7, V8, V9 (9 kV). Vout varies over a range from 0-1200 volts. At PFN full charge voltage of 10200 Volts, the SSC current drops to zero and then acts as a voltage regulator maintaining the charge in the PFN at the proper voltage.

Step 11—De-Erecting

Just prior to firing the PFN capacitor bank, the SSC is shut off and all the switches are opened. In the event of a short, the HV contactor S1 is opened and the SSC is shut off and all of the switches are opened.

The invention having been thus described, it will be apparent to those skilled in the art that the same may be varied in many ways without departing from the spirit and scope of the invention. Any and all such modifications are intended to be included in the scope of the following claims.

What is claimed is:

1. An electronically reconfigurable battery, comprising:
   a first plurality of battery modules;
   a plurality of switches selectively interconnecting said first plurality of battery modules, wherein a selectable number of said plurality of battery modules may be connected either in a series configuration or in a parallel configuration, as a result of placing selected switches of said plurality of switches in open states or closed states;
   a second plurality of battery modules, each of said second plurality of battery modules being permanently connected in parallel with each other, said first plurality of battery modules being selectively connected to said second plurality of battery modules through at least two of said plurality of switches; and
   an output switch connecting a first output terminal of said battery to a first load.

2. An electronically reconfigurable battery as set forth in claim 1, wherein each of said plurality of battery modules is associated with at least three of said plurality of switches, one of which connects said battery module in series with an adjacent battery module when closed, and the other two of which connect said battery module in parallel with an adjacent battery module when closed, such that when said one switch is closed, said other two switches are open, and when said switch is open, said other two switches are closed.

3. An electronically reconfigurable battery as set forth in claim 1, wherein said battery can be reconfigured to match a hybrid vehicle with a variable DC main bus voltage used for parade/standby level reliability and that can reconfigure to shorter life higher power combat mode.

4. An electronically reconfigurable battery as set forth in claim 1, wherein said second plurality of battery modules are connected to a second load at a second output terminal of said battery.

5. An electronically reconfigurable battery as set forth in claim 4, wherein said second load comprises a motor for propelling a vehicle or vessel.

6. An electronically reconfigurable battery as set forth in claim 5, wherein said first load comprises an electromagnetic armor system.

7. An electronically reconfigurable battery as set forth in claim 1, wherein said plurality of switches comprises a plurality of IGBT switches.

8. An electronically reconfigurable battery as set forth in claim 1, wherein said plurality of switches comprises a plurality of MOSFET switches.

9. An electronically reconfigurable battery as set forth in claim 7, wherein said plurality of IGBT switches are opto-isolated switches.

10. An electronically reconfigurable battery as set forth in claim 8, wherein said plurality of MOSFET switches are opto-isolated switches.

11. An electronically reconfigurable battery as described in claim 1, wherein DC current is limited by selection of electrochemical discharge characteristics of the selected battery technology.

12. An electronically reconfigurable battery as described in claim 1, further comprising a series current limiting device, network or system inserted in circuit with the fully erected battery so as to limit DC current.

13. An electronically reconfigurable battery as described in claim 12, wherein said current limiting device, network or system consists of a resistive or inductive component in a RC or LC current limiting circuit.

14. An electronically reconfigurable battery as described in claim 1, further comprising a series current limiting device, network or system inserted in circuit with the partially or sequential erected battery so as to limit DC current.

15. An electronically reconfigurable battery as described in claim 14, wherein said charge current limiting device comprises a single stage converter (SSC) whose output voltage is limited to approximately the battery module voltage level.

16. An electronically reconfigurable battery as described in claim 15, wherein a bypass switch is used to connect the input to the output of the SSC circuit to directly connect the dynamic store portion of the battery with the static portion of the battery.

17. An electronically reconfigurable battery as described in claim 14, where the current limiting device, network or system consists of a resistive or inductive component in a RC or LC current limiting circuit.

18. An electronically reconfigurable battery as described in claim 15, wherein the SSC is an electronic DC-DC converter whose input circuit is connected to the static portion of the battery and whose output is connected to the first stage of the dynamic section of the battery.

19. An electronically reconfigurable battery as described in claim 15, wherein the SSC is an electronic DC-DC converter whose input circuit is connected to a suitable DC source other than the static portion of the battery and the output is connected to the first stage of the dynamic section of the battery.

20. An electronically reconfigurable battery as described in claim 15, wherein the SSC is an electronic converter whose circuit topology is chosen from the group of Buck, Boost, Buck/Boost, step-up, step-down, resonant, isolated, non-isolated, cyclo-converter, or matrix converter.

21. An electronically reconfigurable battery as described in claim 15, wherein the SSC is an electronic AC-DC converter whose input circuit is connected to a suitable AC source and whose output is connected to the first stage of the dynamic section of the battery.

* * * * *